June 20, 1961  F. A. LEISEY  2,989,377
METHOD AND APPARATUS FOR AUTOMATIC TITRATION
AND PROCESS CONTROL
Filed March 2, 1959  5 Sheets-Sheet 1

INVENTOR.
Frank A. Leisey
BY
Everett A. Johnson
ATTORNEY

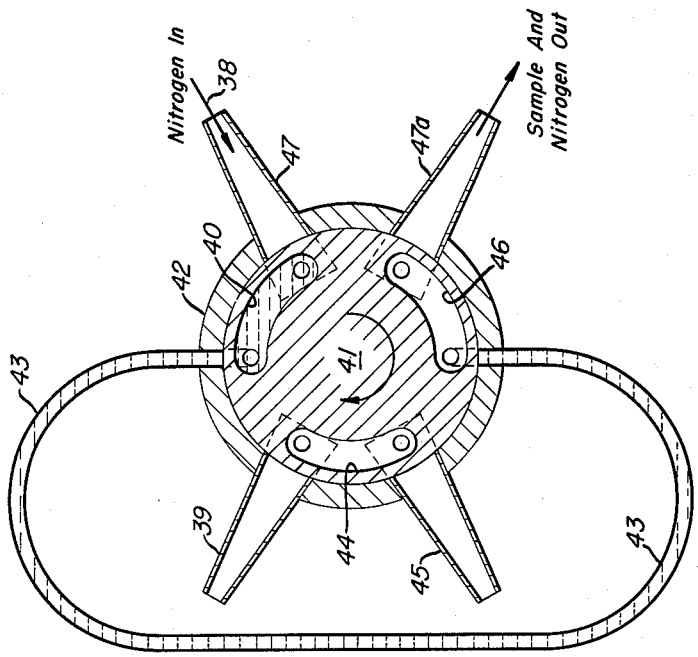
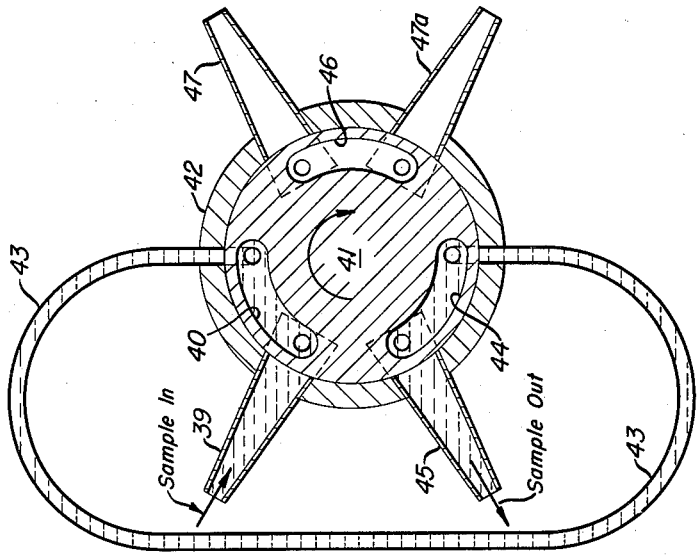

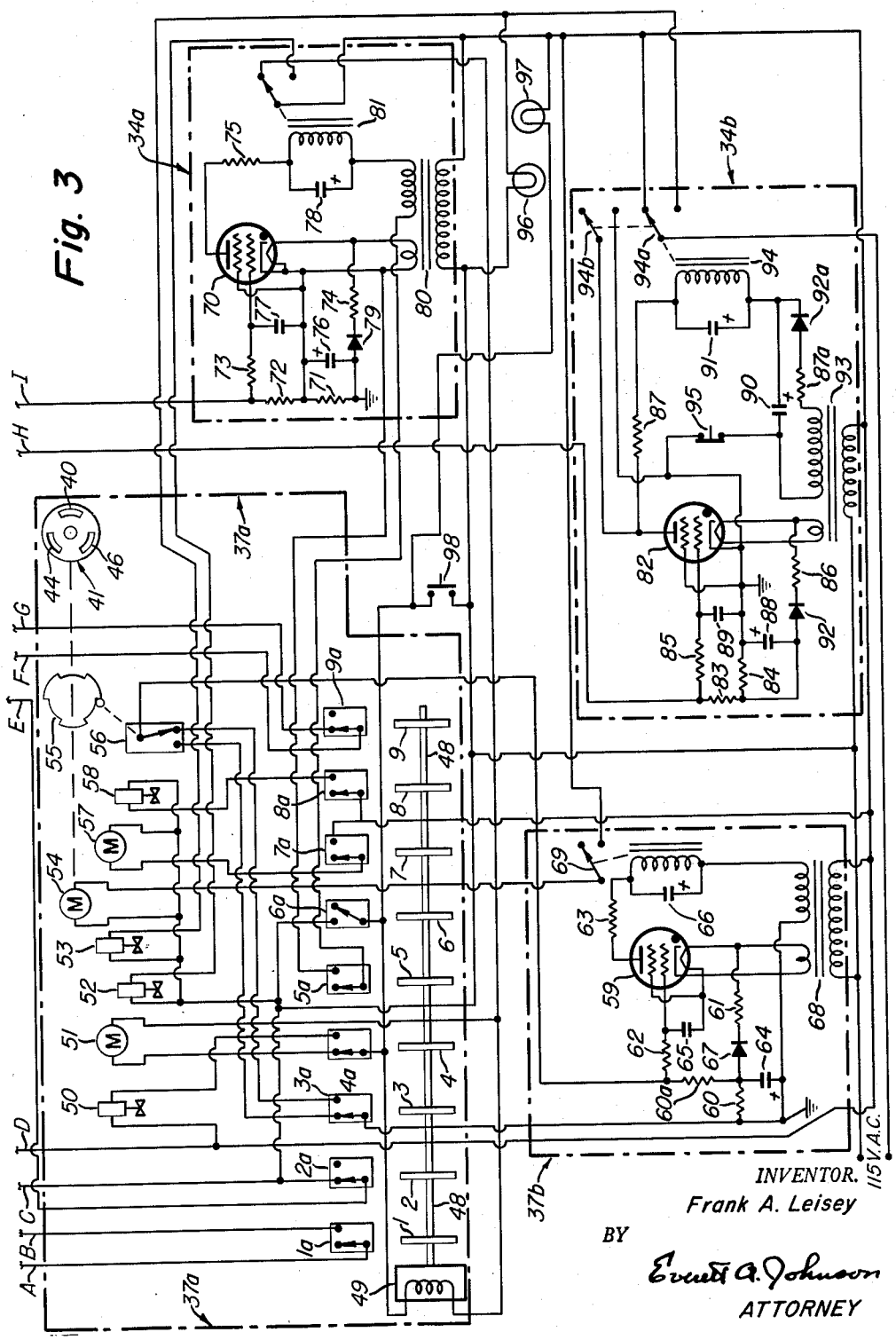

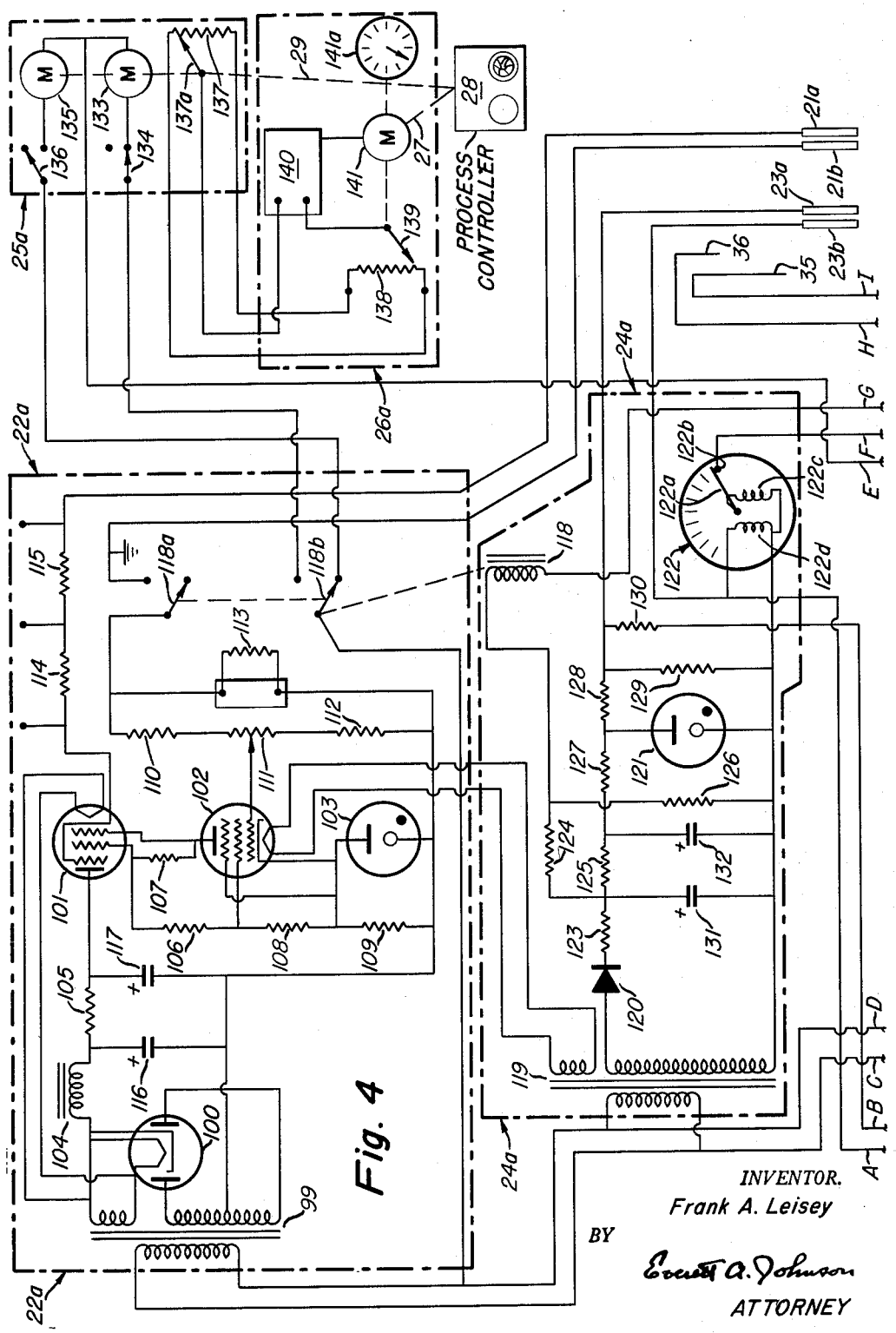

PROGRAM SEQUENCE

| CAM NO. | FUNCTION |
|---|---|
| 1 | Titration Cut Off |
| 2 | Blank Titration Override |
| 3 | Sample Valve |
| 4 | Drain Titration Cell or Stir |
| 5 | Fill With Electrolyte |
| 6 | Stop Cycle |
| 7 | Sample Pump |
| 8 | $N_2$ To Sample Valve |
| 9 | Titration Start |

INVENTOR.
Frank A. Leisey
BY
Ernest A. Johnson
ATTORNEY

United States Patent Office 2,989,377
Patented June 20, 1961

2,989,377
METHOD AND APPARATUS FOR AUTOMATIC TITRATION AND PROCESS CONTROL
Frank A. Leisey, Chicago, Ill., assignor to Standard Oil Company, Chicago, Ill., a corporation of Indiana
Filed Mar. 2, 1959, Ser. No. 796,594
18 Claims. (Cl. 23—230)

This invention relates to an apparatus and method for the automatic titration of fluid samples, and more particularly, it relates to an apparatus and method for the automatic and continuous titration of gaseous and liquid samples to a preselected reference titrant concentration, which apparatus and method may also be used for purposes of process control.

In the commercial operation of various pharmaceutical, chemical, petrochemical and/or petroleum processes and the like, it is essential to monitor various feed and product streams to assure both process and quality control. For example in the petroleum industry it is often necessary to carefully monitor various streams to ascertain, for example, olefin content (customarily expressed as a "Bromine Index") and/or mercaptan-sulfur content (customarily expressed as a "Mercaptan Number"). Similarly, producers of hydrogenated fats, oils, and the like carefully monitor the unsaturation level of feed and product streams (customarily expressed as an "Iodine Number"). For such purposes, samples of the particular stream being monitored must be obtained and analyzed for the desired information, usually by titrametric analysis. Such analyses are costly and sometimes inaccurate. The principal shortcoming, however, is the time delay between taking the sample and completion of the analysis, oftentimes being in excess of an hour or more. Such time delays can be extremely costly. For example, the production of off-specification product for even a relatively short period of time not only results in loss of product for that period but also may spoil large quantities of other materials into which the off-specification product is blended. In some processes titrametric analysis of product is employed as a measure of reaction rate and reaction efficiency. Time delay in receipt of product analysis can lead to substantial losses due to low process efficiency and/or, in certain instances, loss of the catalytic reaction entirely, which occurrence may cost many thousands of dollars.

It is therefore an object of the present invention to provide an inexpensive, rapid, and accurate apparatus and method for automatic and continuous titration of gaseous and liquid streams and, in a specific embodiment, to provide an apparatus and method for prompt process control. It is a further object of the present invention to provide an apparatus and method for automatic, rapid, and continuous determination of the olefin and/or mercaptan-sulfur content of hydrocarbon streams. These and other objects of the present invention will become apparent as the detailed description of the invention proceeds.

To accomplish these objects an apparatus is provided which intermittently and continuously titrates a fluid sample to a preselected reference titrant concentration. The apparatus comprises in combination a titration cell with drain valve; an agitator for agitating fluid in said titration cell; a first set of electrodes for coulometrically generating a titrant at a constant rate in the electrolyte within the titration cell; a second set of electrodes for amperometrically detecting the preselected reference titrant concentration; an electrolyte supply reservoir with valve control whereby a constant volume of electrolyte may be periodically supplied to the titration cell; a source of fluid sample with metering means whereby a constant volume of sample may be added to the titration cell; a timer in circuit with the first and second sets of electrodes, the timer measuring the duration of titrant generation measured from after the addition of fluid sample to the moment at which the second set of electrodes amperometrically detects the preselected reference titrant concentration; and a program-sequence controller operatively connected to the titration cell drain valve, to the valve control of the electrolyte supply reservoir, to the metering means of the source of fluid sample, to the agitator, and to the first and second sets of electrodes.

The program-sequence controller actuates in sequence; the drain valve of the titration cell so as to empty all liquids therefrom, the valve control of the electrolyte supply reservoir so as to add a constant volume of electrolyte to the titration cell, the agitator (usually a magnetic stirrer) so as to mix and circulate the electrolyte within the titration cell, the first set of electrodes so as to coulometrically generate sufficient titrant to reach the preselected reference titrant concentration as detected by the second set of electrodes, the metering means of the source of fluid sample whereby a constant volume of fluid sample is added to the titration cell, and the first set of electrodes so as to coulometrically generate sufficient titrant to reach the preselected reference titrant concentration for the second time, again as detected by the second set of electrodes. The time required to reach the preselected titrant concentration for the second time as indicated by the timer is a measure of the concentration of the titrant-reactive substance in the fluid sample. The time to reach the preselected reference titrant concentration may be used as a control signal to adjust process variables so as to obtain the desired concentration (or range of concentration) of titrant-reactive substance in the stream being monitored. For example, the apparatus and method of the present invention has been very advantageously employed for monitoring the olefin and/or mercaptan-sulfur contents of hydrocarbon streams and for adjusting operating conditions of the particular refining process so as to obtain the desired olefin and/or mercaptan-sulfur levels.

When employing the apparatus and the method of the present invention for monitoring olefin content, advantageously and preferably the titrant is a halogen, e.g., bromine, both sets of electrodes are platinum, and the electrolyte (when employing bromine as the titrant) is a solution comprising potassium bromide, mercuric chloride, water, acetic acid, methanol, and benzene, a typical electrolyte having the following approximate formulation:

| | | |
|---|---|---|
| Potassium bromide _____grams__ | 30– | 300 |
| Mercuric chloride _____do____ | 0.5– | 5 |
| Water (distilled) _____ml__ | 100– | 1,000 |
| Acetic acid (reagent grade) _____ml__ | 1,000– | 10,000 |
| Methyl alcohol (reagent grade) _____ml__ | 1,000– | 10,000 |
| Benzene (reagent grade) _____ml__ | 500– | 5,000 |

When using the apparatus and method of the present invention for monitoring mercaptan-sulfur content, advantageously and preferably the titrant is silver ion, the anode of the generating electrodes is silver and the cathode is normally the stainless-steel titration cell, the anode of the detecting electrodes is platinum or silver and the cathode is gold or silver, and the electrolyte is a solution comprising sodium nitrate, water, ethyl alcohol, acetone, and benzene, a typical electrolyte having the following approximate formulation:

| | | |
|---|---|---|
| Sodium nitrate _____grams__ | 5– | 100 |
| Water (distilled) _____do____ | 50– | 500 |
| Ethyl alcohol (95% tech.) _____ml__ | 1,000– | 10,000 |
| Acetone (tech.) _____ml__ | 1,000– | 10,000 |
| Benzene (tech.) _____ml__ | 700– | 7,000 |

Optionally, the latter electrolyte may also contain 50–500 ml. of a substantially mercaptan-free heater oil (a hydrocarbon boiling within the range of about 200–700° F.) and/or sufficient ammonium hydroxide to render the electrolyte slightly basic.

While the above electrode metals and electrolyte compositions have been found to give excellent results for determination of olefin and mercaptan-sulfur contents, it should be understod that the present invention is not limited thereto. For example, the instrument for monitoring olefin content is equally useful for monitoring the content of many other substances that can be brominated. Similarly, the instrument for monitoring mercaptan sulfur is equally useful for monitoring the content of other substances reactive with silver ions. It is also apparent to one skilled in the art that by judicious selection of electrode design and materials and careful formulation of electrolyte, the apparatus and method of the present invention is readily adaptable to the monitoring and control of a wide variety of gaseous and liquid streams and processes.

Since a written record of results is normally desired, the apparatus of the present invention normally employs a recorder for such purposes, which recorder is responsive to the timer and may be of conventional design. When the apparatus is used to control the process which is being monitored, the process controller usually receives a control signal directly from the timer or indirectly from the timer via the recorder. The nature and function of the process controller itself depends, of course, on a variety of factors, e.g., the stream being sampled, the type of process or process steps to which the material has been subjected and/or will be subjected, and the like. For example, the process controller may merely illuminate warning lights or sound an audible alarm when olefin content, mercaptan-sulfur content and/or the like fall below minimum desired levels or exceed maximum desired levels. The process controller may also automatically adjust process conditions, e.g., temperature, pressure, contact time, space velocity, catalyst or treating-agent replacement rate, and/or the like to achieve the desired stream quality. For such purposes, the control signal from the timer and/or recorder may be directly proportional to the olefin content, mercaptan-sulfur content, or the like, or may merely indicate when the characteristic being measured falls outside a particular level or range. The particular process control step is within the skill of the art and the present invention is not limited to any particular step.

The present invention will be more clearly understood by reference to the following detailed description, read in conjunction with the accompanying drawings, wherein:

FIGURES 2a and 2b show the details of a sample metering valve of the type which is used in the sample metering device of FIGURE 1 to provide a constant volume of sample to the titration cell;

FIGURES 3 and 4 show details of the circuitry and the components of the apparatus of FIGURE 1 and are to be read as one complete drawing with FIGURE 4 placed above FIGURE 3.

Figure 1:
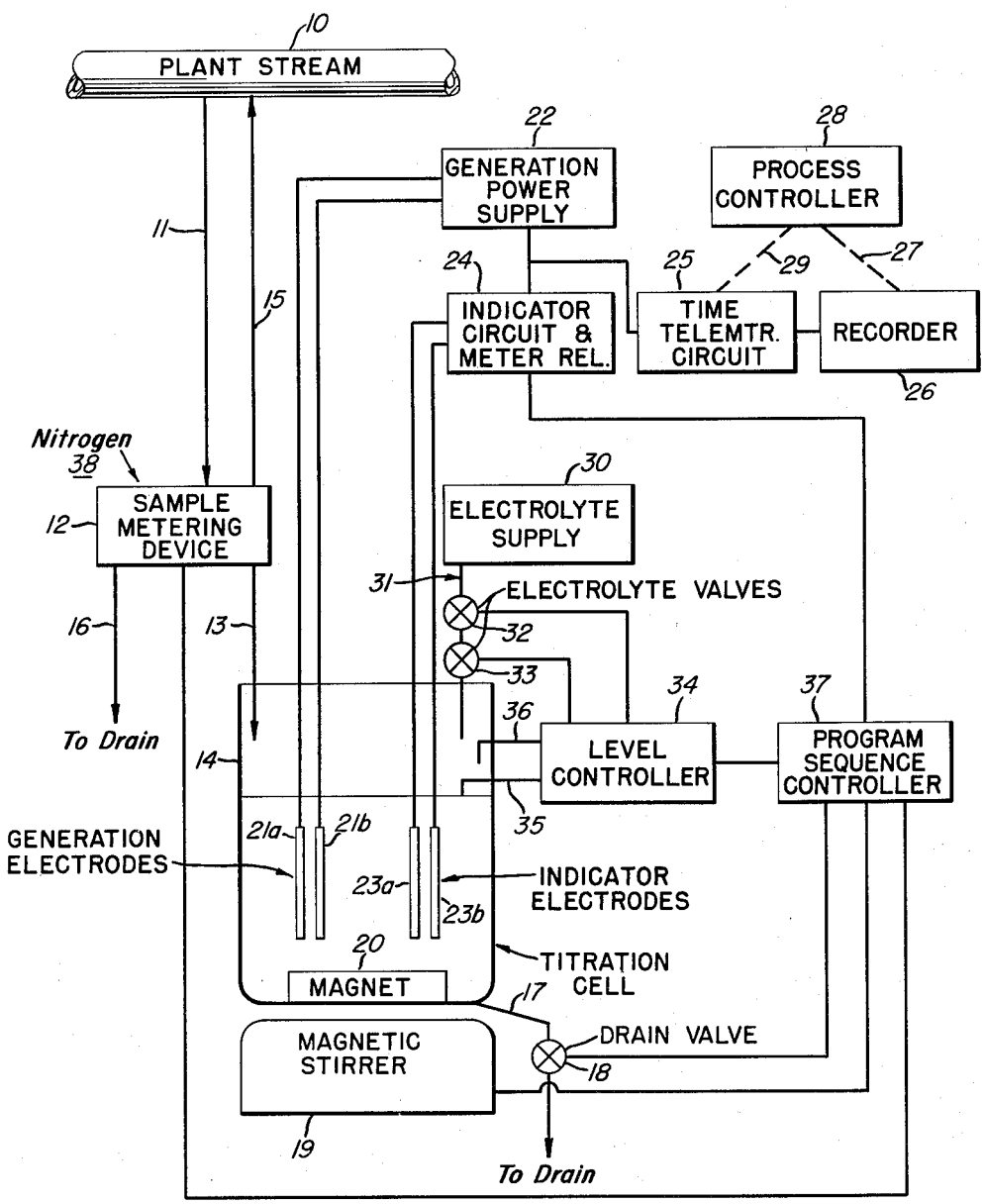
FIGURE 1 is a schematic drawing of the major components of the present apparatus.

Referring to FIGURE 1, the gaseous or liquid stream being monitored from plant-stream source 10 is passed via line 11 to sample metering device 12, said sample metering device including a sample pump of conventional design and a sample metering valve to be discussed hereinafter in connection with FIGURES 2a and 2b. For purposes of this detailed description only and not by way of limitation, the stream being monitored is assumed to be a hydrocarbon stream, the characteristic being measured is its olefin content as measured by its Bromine Index, and the titrant is therefore bromine. That portion of the hydrocarbon sample stream in excess of that which is transferred via line 13 to titration cell 14 may be returned to plant stream 10 via line 15 or discarded to a drain via line 16.

Titration cell 14 is typically a metal vessel, e.g., stainless-steel cylinder, a plastic container, e.g., polypropylene or polyethylene cylindrical jar or a glass container, the latter being assumed in this example, with outlet drain line 17 and drain valve 18. A magnetic stirrer 19 is used in conjunction with magnet 20 to agitate, mix, and/or otherwise circulate the electrolyte and hydrocarbon sample within titration cell 14. A first set of platinum electrodes 21a and 21b are employed in conjunction with power supply 22 to coulometrically generate bromine in the electrolyte to be described hereinafter. A second set of platinum electrodes 23a and 23b are employed in conjunction with indicator circuit and meter relay 24 to amperometrically detect a preselected bromine concentration in the electrolyte. A time-telemeter circuit, i.e., timer 25, measures the duration of bromine generation by electrodes 21a (anode) and 21b (cathode) until the preselected bromine concentration in the electrolyte is detected by electrodes 23a (anode) and 23b (cathode). The generation time is recorded, usually on chart paper in recorder 26, which may optionally send a control signal 27 to process controller 28. Alternatively, a control signal 29 may be sent directly to process controller 28 from timer 25. Process controller 28 adjusts, if necessary, the appropriate process variables so as to obtain the desired olefin content of plant stream 10 or adjusts operations of treating steps to which plant stream 10 is subsequently being subjected.

The electrolyte is supplied to titration cell 14 from electrolyte supply reservoir 30 via line 31 and valves 32 and 33, which are controlled by level controller 34. Valve 33 is normally closed and is opened by level controller 34 only when electrolyte is being supplied from electrolyte supply reservoir 30 to titration cell 14. As soon as the level of electrolyte in titration cell 14 reaches the fill electrode 35, the level controller closes valve 33. Valve 32 is normally open and serves as a safety precaution in the event of malfunction of valve 33. For example, should valve 33 leak electrolyte even after it is closed, valve 32 would be closed by level controller 34 as soon as the electrolyte reaches the overfill electrode 36. For purpose of the detailed description, the electrolyte may advantageously having the following composition:

| | | |
|---|---|---|
| Potassium bromide | grams | 120 |
| Mercuric chloride | do | 3 |
| Water (distilled) | ml | 450 |
| Acetic acid (reagent grade) | ml | 3,000 |
| Methyl alcohol (reagent grade) | ml | 3,000 |
| Benzene (reagent grade) | ml | 1,500 |

The entire apparatus is operated automatically by means of signals from program-sequence controller 37. A typical cycle normally starts with a flushing step and begins when program-sequence controller 37 starts the sample pump (not shown in this figure), which is part of the sample metering device 12. The sample pump passes the hydrocarbon sample stream, which enters the sample metering device 12 via line 11, through the sample metering valve (also not shown) and thence to a drain via line 16 or back to plant stream via line 15. As soon as the sample valve is flushed with fresh sample, the sample valve is actuated so as to send a controlled volume of sample to titration cell 14 via line 13. Nitrogen at about 5 to 10 pounds per square inch gauge from source 38 is used to force all of the sample out of the sample valve and connecting lines into titration cell 14. Drain valve 18 is then actuated so as to drain titration cell 14 via line 17. Drain valve 18 is closed, thereby completing the flushing portion of the cycle, and electrolyte is then supplied to the cell from electrolyte supply reservoir 30 by opening valve 33 in line 31. As soon as the electrolyte level reaches electrode 35, valve 33 is closed and magnetic stirrer 19 thereafter rotates magnet 20 so as to agitate the electrolyte.

At this point a blank titration is performed so as to bring the bromine concentration to a preselected level, the particular level not being critical. Generally, the level selected is at least the minimum bromine concentration which will result in a current readily detectable by electrodes 23a and 23b and the associated circuitry. As soon as the bromine concentration in the electrolyte reaches the preselected level, power supply 22 is deactivated and bromine generation stopped. This portion of the cycle establishes the reference bromine concentration employed in the sample titration to follow.

At this point a known constant volume of the hydrocarbon sample to be titrated is added to titration cell 14 from sample metering device 12 via line 13. Bromine is again generated at a constant rate by means of generation power supply 22 and generation electrodes 21a and 21b and react with any olefin in the hydrocarbon sample. The generation of bromine continues until indicator electrodes 23a and 23b again detect the preselected bromine concentration. Timer 25 measures the duration of bromine generation, which duration is directly proportional to olefin content of the sample, and the time duration is recorded by recorder 26. Appropriate control signals 27 and/or 29 may then be sent to process controller 28.

FIGURES 2a and 2b show two different sequences in the operation of a typical sample valve which is part of sample metering device 12 of FIGURE 1. The sample metering valve per se is not part of the present invention, and any device which will perform the functions as hereinafter described may be employed. FIGURE 2a shows one such valve in that portion of the valve cycle in which sample is being pumped through the sample loop and thence to the drain. FIGURE 2b shows the same valve in that portion of the valve cycle in which the constant amount of sample in the sample loop is being discharged to the titration cell.

Specifically, the hydrocarbon sample enters the valve via inlet 39 and during the flush cycle passes via transfer crescent 40 of inner valve body 41, which is rotatable, usually clockwise, with respect to outer valve body 42, through sample loop 43 and is discharged via transfer crescent 44 and outlet 45. An additional transfer cresent 46 is provided, all three transfer crescents being spaced at intervals of 120°. Thus by rotation of inner valve body 41 and all three transfer crescents by increments of 60°, it is apparent that sample loop 43 is first connected to inlet and outlet ports 39 and 45, as shown in FIGURE 2a, and then to inlet and outlet ports 47 and 47a, as shown in FIGURE 2b.

Referring to FIGURE 2a, hydrocarbon sample is introduced to sample loop 43 by means of a sample pump of conventional design (not shown) which transfers the hydrocarbon sample from line 11 of FIGURE 1 to inlet port 39. As an alternative to a pump, the sample pump may merely comprise a closed container or reservoir which receives the hydrocarbon sample from line 11 of FIGURE 1 and transfers it at the appropriate time to inlet 39 of the sample valve, nitrogen pressure being used to effect the transfer. After passing through sample loop 43, the hydrocarbon sample is discharged via outlet port 45, which is usually connected to drain line 16 or return line 15 of FIGURE 1. Referring to FIGURE 2b, in which inner valve body 41 of all three transfer crescents have been rotated, clockwise by 60°, the hydrocarbon sample entrapped in sample loop 43 now flows out of the sample loop via outlet port 47a (which is connected to line 13 of FIGURE 1) and thence into the titration cell. Nitrogen purge gas for removing all traces of the sample from sample loop 43 is introduced from source 38 via inlet port 47 and, after passing through the sample loop, exists via outlet port 47a. At the same time flow of sample into inlet port 39 and out of outlet port 45 to the drain may be either continued or discontinued, the latter situation being illustrated in FIGURE 2b.

FIGURES 3 and 4 show details of the circuitry employed in the present apparatus and are to be read as one complete drawing with FIGURE 4 placed above FIGURE 3. Interconnected wiring is indicated by corresponding lettered terminals A through I (left to right) at the top of FIGURE 3 and the bottom of FIGURE 4 respectively. Because of the complexity of the circuitry, major components have been segregated, where feasible, for purposes of this description by means of dashed outlines. The various components and functions thereof are, of course, interrelated and thus a particular dashed outline does not necessarily contain all elements of the particular component nor all elements influencing its operation. For preliminary orientation, major components are itemized in the following tabulation and will be discussed in detail hereinafter. Where possible, the dashed outlines have been given the same numbers in FIGURES 3 and 4 as their approximate equivalent in FIGURE 1, plus an additional subscript letter, e.g., "a," "b," and the like, in some instances, to achieve further clarity.

| Figure No. | Dashed Outline No. | Description |
|---|---|---|
| 3 | 37a | Cams, associated microswitches, motors, solenoids, and the like which control sequence of operations to a large extent. |
| 3 | 37b | Relay circuit which controls, in part, the rotation of inner body 41 of the sample valve described in FIGURES 2a and 2b. |
| 3 | 34a | Relay circuit which controls level of electrolyte in titration cell 14 of FIGURE 1 by closing valve 33 when electrolyte reaches electrode 35. |
| 3 | 34b | Relay circuit which safeguards against overfilling titration cell 14 of FIGURE 1 by closing valve 32 when electrolyte reaches electrode 36. |
| 4 | 22a | Power supply for generating bromine at constant rate via electrodes 21a and 21b in the electrolyte of titration cell 14. |
| 4 | 24a | Indicator circuit and meter relay which detects when preselected bromine concentration is reached in the electrolyte of titration cell 14. |
| 4 | 25a | Time-telemeter circuit which measures duration of bromine generation during titration. |
| 4 | 26a | Conventional recorder for recording duration of bromine generation during titration. |

In FIGURES 3 and 4 the various relays, switches and the like are shown in the positions they are in at the beginning of the cycle, and it should be understood that these positions change throughout the cycle, as will become evident hereinafter.

Referring to FIGURE 3 and, specifically, to dashed outline 37a, the sequence of operations of the apparatus is controlled by a series of nine cams, numbered 1 through 9, with associated microswitches numbered 1a through 9a respectively. The cams are connected to a common shaft 48 which is rotated by electric drive 49, one complete rotation of shaft 48 taking about 500 seconds and corresponding to a complete cycle of the apparatus. The function and the time relationship of the operation of each cam are described hereinafter in conjunction with the "master cam" diagram presented in FIGURE 5.

Among the elements of dashed outline 37a which are controlled by the various microswitches, which are in turn controlled by their respective associated cams, are drain valve solenoid 50, which operates drain valve 18 of FIGURE 1 so as to drain titration cell 14; stirring motor 51, which is part of magnetic stirrer 19 of FIGURE 1; fill-valve solenoid 52, which controls electrolyte fill valve 33 of FIGURE 1; and safety-valve solenoid 53, which controls electrolyte safety valve 32 of FIGURE 1. Also included in dashed outline 37a is sample valve motor 54, which rotates inner valve body 41 of the sample valve shown in FIGURE 2 and also special valve cam 55 and associated microswitch 56. As further details of the circuit are described, it will become apparent that by means of special valve cam 55 and microswitch 56 the sample valve motor 54 rotates inner valve body 41 with accompanying transfer crescents 40, 44, and 46 through an arc of 60° during each operation. The reason for a rotation of 60° is clear from the description of the operation of the valve mechanism shown in FIGURES 2a and 2b. Still further included in dashed outline 37a are sample pump motor 57, which is part of sample metering device 12 of FIGURE 1 and serves to pump samples of the stream being analyzed through the sample valve described in FIGURES 2a and 2b; and nitrogen-valve solenoid 58, which controls the nitrogen flow for purging sample from the sample valve.

Power, i.e., 115 volts A.C., to sample valve motor 54 is supplied when cam switches microswitch 3a so as to remove bias from thyratron 59 shown in dashed outline 37b, which encloses the sample valve relay circuit. In addition to thyratron 59 this circuit is made up of resistors 60, 60a, 61, 62, and 63; capacitors 64, 65, and 66; germanium rectifier 67; transformer 68; and relay 69. The circuit is designed so that as soon as bias is removed from thyratron 59 by action of cam 3 and microswitch 3a, which thyratron then fires, the resulting current in relay 69 switches the relay control to the lower position, and connects 115 volts A.C. to sample valve motor 54. The motor rotates 60° and is stopped by the action of special valve cam 55 and associated microswitch 56, which results in bias again being placed on thyratron 59, thereby stopping current flow and opening relay 69.

The electrolyte level or fill relay circuit shown in dashed outline 34a is actuated when cam 5 and associated microswitch 5a places voltage on the plate circuit of thyratron 70, thereby firing it. In addition to thyratron 70, this circuit is made up of resistors 71, 72, 73, 74, and 75; capacitors 76, 77, and 78, germanium rectifier 79; transformer 80 and relay 81. When thyratron 70 fires, the resulting current in relay 81 switches the relay contact to the lower position thereby removing power from electric drive 49 and stopping rotation of cam shaft 48 and applying power to fill solenoid 52, which opens electrolyte fill valve 33 of FIGURE 1. Thyratron 70 continues to conduct until bias is applied to the tube by means of electrolyte in titration cell 14 touching fill electrode 35, thereby grounding it (via grounded electrode 21b). The contact of relay 81 then returns to the upper position, electric drive 49 is energized, and cam 5 with associated microswitch 5a removes plate voltage from thyratron 70.

The electrolyte overfill relay circuit shown in dashed outline 34b is actuated when a malfunction allows electrolyte in titration cell 14 of FIGURE 1 to contact over-fill electrode 36, thereby grounding it (via grounded electrode 21b). This occurrence removes bias from thyratron 82, causing it to fire. In addition to thyratron 82, this circuit is made up of resistors 83, 84, 85, 86, 87, and 87a; capacitors 88, 89, 90, and 91; germanium rectifier 92; selenium reftifier 92a; transformer 93; relay 94; and normally-closed push-button switch 95. When thyratron 82 fires, the resulting current in relay 94 switches both relay contacts, 94a and 94b, to the lower positions. Switching contact 94a to the lower position lights red-warning light 96, removes power from electric drive 49 and connected circuits, including "normal-operation" green light 97, thereby stopping rotation of cam shaft 48, and applies power to safety-valve solenoid 53, which closes safety valve 32 of FIGURE 1. Switching contact 94b to the lower position shorts out thyratron 82, thereby stopping current flow through the thyratron, but current continues to flow in the relay circuit. Thyratron 82 thus loses control over relay 94. After the malfunction is corrected and over-fill electrode 36 is no longer grounded, control of relay 94 is returned to thyratron 82 by momentarily opening reset switch 95.

Push switch 98 in the center of FIGURE 3 is the start switch for the apparatus. For a single cycle, to be described hereinafter, push switch 98 is closed momentarily, thereby applying power to electric drive 49, rotating cam shaft 48, cam 6 of which closes microswitch 6a, thus maintaining power on electric drive 49 even after push switch 98 is opened. If the apparatus is to be operated continuously without interruption between cycles, push switch 98 is locked closed. If it is left open, the apparatus will be automatically stopped at the end of a titration cycle when cam 6 opens microswitch 6a.

Referring to FIGURE 4, dashed outline 22a shows the circuitry employed to generate the titrant, e.g., bromine, at a constant rate via electrodes 21a and 21b which are immersed in the electrolyte in titration cell 14 of FIGURE 1. This constant-current circuit is made up of transformer 99; rectifier 100, pentodes 101 and 102, and regulator tube 103; choke 104; resistors 105, 106, 107, 108, 109, 110, 111, 112, 113, 114, and 115; capacitors 116 and 117, and relay contacts 118a and 118b of relay 118 (to be described hereinafter). The circuit is designed to start generating bromine and to start the time-telemeter circuit when relay 18 of dashed outline 24a raises contacts 118a and 118b simultaneously to the upper position. The particular constant-rate of bromine generation depends on a number of factors, e.g., olefin level being measured, and is adjustable by changing the value of resistor 113 (coarse adjustment) and varying the tap point on resistor 111 for the grid of pentode 102 (fine adjustment). For example, typical values for resistor 113 to achieve various generating currents are as follows:

| Resistor 113 | Resulting generating current |
| --- | --- |
| Open | ma__ 1 |
| 40K | ma__ 5 |
| 15K | ma__ 10 |
| 6K | ma__ 20 |

Once the instrument is calibrated for a particular constant current, its calibration can be periodically and readily checked by measuring voltage drop across resistor 114 and/or resistor 115, taps being provided for such purpose.

The circuit for detecting, via electrodes 23a and 23b in the electrolyte of titration cell 14 of FIGURE 1, when the preselected reference bromine concentration is reached is shown in dashed outline 24a of FIGURE 4. This circuit is made up of previously mentioned relay 118; transformer 119; selenium rectifier 120; regulator tube 121; meter relay 122, including indicator-contact 122a, adjustable contact terminal 122b and meter coils 122c and 122d; resistors 123, 124, 125, 126, 127, 128, 129, and 130; and capacitors 131 and 132. The circuit is designed so that when no current flows through relay 118, relay contacts 118a and 118b are raised to the upper position, thus generating bromine in the electrolyte and starting time-telemeter circuit shown in dashed outline 25a, hereinafter discussed.

Whether or not current flows through relay 118 is controlled by meter relay 122. Prior to generating bromine, indicator-contact 122a of meter relay 112a is locked in contact with adjustable contact terminal 122b by flow of current through coil 122c. To release indicator-contact 122a from terminal 122b, cam 9 momentarily opens microswitch 9a, thus breaking the circuit to coil 122c. The position of indicator contact 122a then depends on current flow through coil 122d, the greater the current the closer contact 122a approaches terminal 122b. Typically, the meter relay is adjusted so that contact 122a contacts and thus locks on terminal 122b when a current in the range of about 1 to 50 microamperes flows through coil 122d. Such current flow occurs when excess bromine is generated in the electrolyte by electrodes 21a and 21b and associated circuitry already described. The exact current is not critical so long as it is the current for which the apparatus is calibrated. It depends on type of titration being performed, the electrodes employed, and/or the like. As soon as contact 122a locks in contact with terminal 122b, the resulting current flow through relay 118 lowers contacts 118a and 118b, stopping both generation of bromine and the time-telemeter circuit.

In the normal operation of the apparatus, the time alloted by program-sequence controller 27 of FIGURE 1 for titration of the sample is more than that actually required. Should a sample be encountered which is beyond the range of time so allotted, cam 1 and associated microswitch 1a automatically stops the titration by placing resistor 130 across electrodes 23a and 23b, thus assuring more than enough current through coil 122d to lock indicator contact 122a to adjustable terminal 122b. It should be understood, of course, that the apparatus is flexibly designed so that it can readily be adapted to handle any sample within the allotted time. For example the titration can be greatly accelerated, if necessary, by selecting a lower value for resistor 113 and thus increasing generation current. The allotted time for titration can also be increased, if necessary, by redesigning the cams and the speed at which they rotate. The action of cam 1 and microswitch 1a is in the nature of an added feature which copes with abnormal samples and should not be considered as a limitation in the apparatus or method.

The time-telemeter circuit is shown in dashed outline 25a and is made up of upscale recorder drive motor 133, associated limit switch 134, zero return drive motor 135, associated limit switch 136, and potentiometer 137 with slider 137a. The circuitry is designed so that movement of slider 137a from a zero time reference point at the upper end of the scale is proportional to time of bromine generation, i.e., motor 133 moves slider 137a at a constant rate away from the zero time reference point during bromine generation. The maximum movement achieved during bromine generation is a measure of olefin concentration of the sample. At the end of bromine generation, slider 137a is returned to the zero time reference point by motor 135 and associated limit switch 136. Return to the zero time reference point can alternatively be carried out by means of spring-return devices readily available commercially. Because the blank titration portion of the cycle has no significance per se and could lead to confusion in interpreting records of the sample titration itself, said records being prepared by the recorder circuit to be discussed hereinafter, cam 2 and associated microswitch 2a cuts out the time-telemeter circuit and recorder during the blank titration portion of the cycle.

The recorder circuit is of conventional design and is made up of potentiometer 138 with slider 139; servo-amplifier 140; servo-motor 141, which is operatively connected so as to adjust slider 139; and pointer means 141a, which is responsive to servo-motor 141. The circuit is designed so that if a voltage appears across the terminals of 140, servo-motor 141 adjusts tap 139 so as to cancel out the voltage. It is readily apparent that movement of servo-motor 141, which also drives pointer means 141a of the recorder, is proportional to time of bromine generation and thus to olefin content of the sample. Thus a record of olefin content is automatically prepared. It is apparent from the design of the time-telemeter circuit that, as an alternative to the recorder circuit, a recorder pointer or its equivalent could be actuated directly by upscale recorder drive motor 133.

It should be understood, of course, that the recorder can be made to read directly in the desired units of measurement. For example, when using "Bromine Index" as the measure of olefin concentration, the recorder may read directly in units of "Bromine Index," said "Index" having the following relationship:

$$\text{Bromine Index} = \frac{79.9 \times I \times T}{965 \times V \times D}$$

where 79.9 is the equivalent weight of bromine, 965 is a combined conversion factor. I is the coulometric current in milliamperes, T is the titration time in seconds, V is the sample volume in milliliters and D is the sample density in grams per milliliter. With a fixed sampling device on a given plant stream the Bromine Index of the sample is equal to a constant times the titration time, movement of the servo-motor 141 being proportional to titration time. On samples that react slowly with bromine and are not completely titrated with one approach to the end point, the first titration time is multiplied by an additional factor, K, characteristic of the sample titrated, in order to obtain the true Bromine Index of the sample.

Similarly, if the present apparatus and method were employed to measure mercaptan-sulfur content of a hydrocarbon stream, i.e., the Mercaptan Number, silver ions being used as the titrant ion, the following relationship would prevail:

$$\text{Mercaptan Number} = \frac{I \times T}{30 \times V}$$

which would also reduce down to a constant times the titration time.

Process controller 28 may be of any conventional design and receives control signals from either the time-telemeter circuit via signal 29 or the recorder circuit via signal 27. As previously mentioned, process controller 28 may merely light or sound an alarm when olefin content falls below the minimum desired and/or above the maximum desired. Alternatively, this information or a signal proportional to olefin content may be employed to adjust operating conditions for the process to which the stream is to be subjected or has already been subjected.

Figure 5:
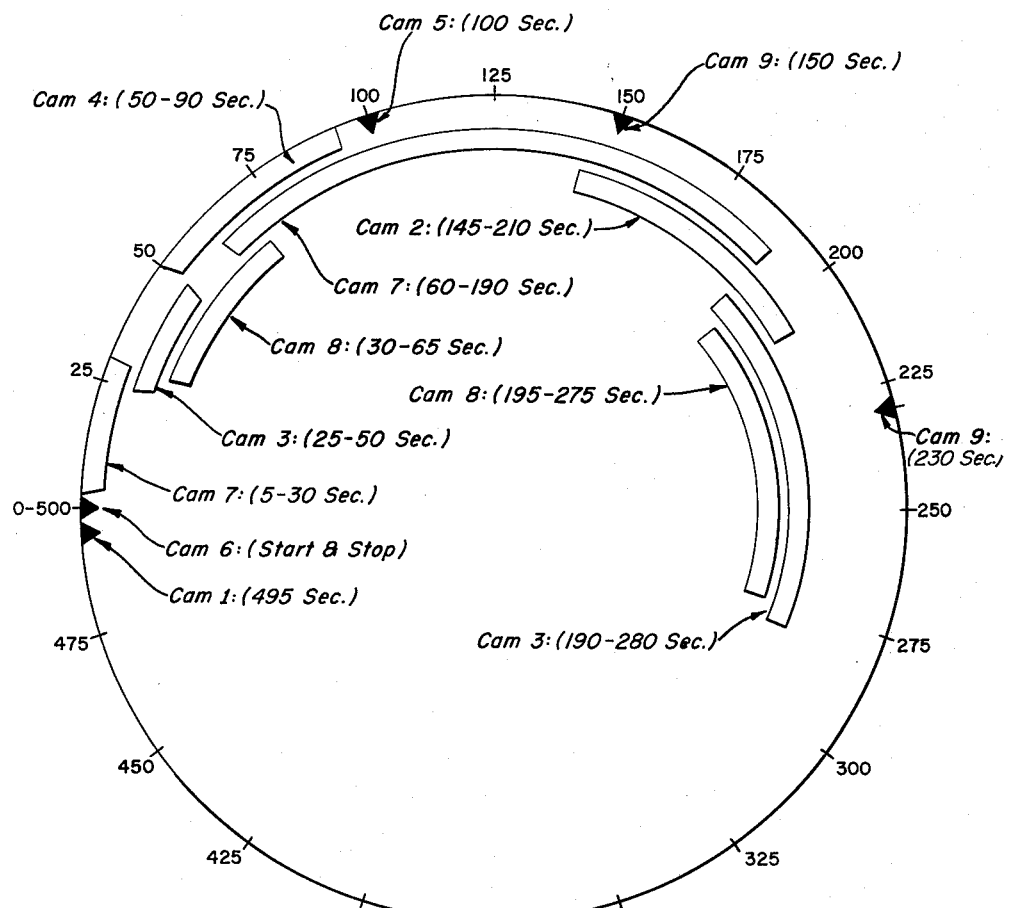
FIGURE 5 is a master cam diagram showing the relative time sequence of the functions of the nine cams employed in the program-sequence controller shown schematically in FIGURE 1 and in detail in FIGURES 3 and 4.

The method and apparatus of the present invention will be more clearly understood by reference to FIGURE 5, which illustrates the function of the various cams and the time relationship of the various operations. In short, FIGURE 5 is a "master cam" diagram (not an actual cam) from which cams 1 thru 9 were designed. The cams are rotated at a typical rate of one revolution per 500 seconds. A complete cycle thus takes 500 seconds plus the time that the cams are stopped while electrolyte is being added to the cell. This takes about 20 seconds, thus raising total time per cycle to about 520 seconds.

In FIGURE 5 the cycle starts at zero time with depression of push switch 98 of FIGURE 3. This in effect closes microswitch 6a which is normally actuated by cam 6. The subsequent operations during the cycle plus additional cam information are summarized for brevity in the following tabulation, which should be read in conjunction with FIGURE 5:

*Program sequence: 500 seconds cycle time*

| Time, Seconds | Cam | Function |
|---|---|---|
| 0 | 6 | Start. |
| 5 | 7 | Sample pump started. |
| 25 | 3 | Sample pump operates—sample goes to cell. |
| 30 | 8 | $N_2$ solenoid energized. |
| 30 | 7 | Sample pump stopped. |
| 50 | 3 | Sample valve operates to return valve to fill position. |
| 50 | 4 | Dump solenoid energized. |
| 60 | 7 | Sample pump started. |
| 65 | 8 | $N_2$ solenoid deenergized. |
| 90 | 4 | Dump solenoid deenergized. |
| 100 | 5 | Fill solenoid energized. |
| 145 | 2 | Blank titration override on. |
| 150 | 9 | Titration of blank started. |
| 190 | 3 | Sample valve operates—sample goes to cell. |
| 195 | 8 | $N_2$ solenoid energized. |
| 210 | 2 | Blank override off. |
| 230 | 9 | Titration of sample started. |
| 275 | 8 | $N_2$ solenoid deenergized. |
| 280 | 3 | Sample valve operates to return to fill position. |
| 495 | 1 | Titration cut off. |
| 500 | 6 | Stop. |

Cam information

| Cam | Function | Time Relationship, Seconds |
|---|---|---|
| 1 | Titration Cut Off | 495. |
| 2 | Blank Titration Override | 145–210. |
| 3 | Sample Valve Operation | 25–50; 190–280. |
| 4 | Drain Cell or Stir | 50–90. |
| 5 | Fill Titration Cell | 100. |
| 6 | Stop Cycle (Start also) | 500 (0 Sec.). |
| 7 | Sample Pump Operation | 5–30; 60–190. |
| 8 | $N_2$ to Sample Valve | 30–65; 195–275. |
| 9 | Titration | 150–190 max; 230–495 max. |

While at time 500 seconds, the above tabulation indicates that cam 6 stops the apparatus, this is true, as previously mentioned, only if push switch 98 of FIGURE 3 is left open. If push switch 98 is closed, the apparatus automatically continues with the next cycle without interruption.

Numerical values and/or identification of various elements of the circuits described in FIGURES 3 and 4 are cataloged hereinafter. Values for other miscellaneous components are apparent to those skilled in the art in the light of the above description and the following table:

| RESISTORS | |
|---|---|
| 60 | 27K |
| 60a | 1M |
| 61 | 1K |
| 62 | 0.1M |
| 63 | 2K |
| 71 | 27K |
| 72 | 1M |
| 73 | 0.1M |
| 74 | 1K |
| 75 | 2K |
| 83 | 1M |
| 84 | 27K |
| 85 | 0.1M |
| 86 | 1K |
| 87 | 2K |
| 87a | .047K |
| 105 | 1K |
| 106 | 56K |
| 107 | 0.68M |
| 108 | 15K |
| 109 | 0.15M |
| 110 | 56K |
| 111 | 12K |
| 112 | 82K |
| 113 | Selected |
| 114 | 1K |
| 115 | 0.005K |
| 123 | 0.047K |
| 124 | 6.8K |
| 125 | 4.7K |
| 126 | 33K |
| 127 | 15K |
| 128 | 82K |
| 129 | 0.22K |
| 130 | 10K |
| 137 (Potentiometer) | 1K |
| 138 (Potentiometer) | 0.02K |

| CAPACITORS | | |
|---|---|---|
| 64 | µf | 5 |
| 65 | µf | 0.01 |
| 66 | µf | 10 |
| 76 | µf | 5 |
| 77 | µf | 0.01 |
| 78 | µf | 10 |
| 88 | µf | 5 |
| 89 | µf | 0.01 |
| 90 | µf | 10 |
| 91 | µf | 10 |
| 116 | µf | 40 |
| 117 | µf | 40 |
| 131 | µf | 40 |
| 132 | µf | 40 |

| TUBES | |
|---|---|
| 59 | 5,696 |
| 70 | 5,696 |
| 82 | 5,696 |
| 100 | 6X4 |
| 101 | 6AR5 |
| 102 | 5,879 |
| 103 | 5,651 |
| 121 | 5,651 |

| SYMBOLS | |
|---|---|
| K | $10^3$ ohms. |
| M | $10^6$ ohms. |
| µf | microfarad |

From the description herein it is apparent that the objects of this invention have been attained. While the invention has been described in connection with a specific embodiment thereof for use in monitoring olefin content ("Bromine Index") of hydrocarbon streams, such description is in no way to be construed as being restrictive or limiting. Various alternatives, including different applications, components, operating sequences, and the like, will be apparent from the above detailed description to those skilled in the art and such alternatives are to be considered within the scope and spirit of the present invention.

Having thus described the invention, what is claimed is:

1. An apparatus for intermittent-continuous titration of a fluid sample to a preselected reference titrant concentration which comprises in combination a titration cell with drain valve; an agitator for agitating fluid in said titration cell; a first set of electrodes for coulometrically generating a titrant at a constant rate in the electrolyte within said titration cell; a second set of electrodes for amperometrically detecting the preselected reference titrant concentration; an electrolyte supply reservoir with valve control whereby a constant volume of electrolyte may be periodically supplied to said titration cell; a source of fluid sample with metering means whereby a constant volume of sample may be added to said titration cell; a timer in circuit with said first and said second sets of electrodes, said timer measuring the duration of titrant generation measured from after the addition of fluid sample to the moment at which said second set of electrodes amperometrically detects the preselected titrant concentration; a program-sequence controller operatively connected to said titration cell drain valve, to said valve control of said electrolyte supply reservoir, to said metering means of said source of the fluid sample, to said agitator, and to said first and second sets of electrodes so as to actuate in sequence: said drain valve of said titration cell so as to empty substantially completely all liquids therefrom, said valve control of said electrolyte supply reservoir so as to add a constant volume of electrolyte to said titration cell, said agitator so as to agitate said electrolyte within said titration cell, said first set of electrodes so as to coulometrically generate sufficient titrant to reach the preselected reference titrant concentration as detected by said second set of electrodes, said metering means of said source of fluid sample whereby a constant volume of fluid sample is added to said titration cell, said first set of electrodes so as to coulometrically generate sufficient titrant to reach the preselected reference titrant concentration for the second time, whereby the time to reach the preselected reference titrant concentration for the second time as indicated by said timer is a measure of the concentration of titrant-reactive substance in the fluid sample.

2. The apparatus of claim 1 wherein the anode of said first set of electrodes is silver, said titration cell is stainless steel and the cathode of said first set of electrodes is at least a portion of said titration cell.

3. The apparatus of claim 1 wherein the anode of said second set of electrodes is a metal selected from the group consisting of platinum and silver and the cathode is a metal selected from the group consisting of gold and silver.

4. The apparatus of claim 1 wherein the electrodes of said first set and said second set of electrodes are platinum.

5. An electrolyte for use in a titration system comprising sodium nitrate, water, ethyl alcohol, acetone, and benzene.

6. An electrolyte for use in a titration system comprising potassium bromide, mercuric chloride, water, acetic acid, methyl alcohol, and benzene.

7. The apparatus of claim 1 including process control means responsive to said timer.

8. The apparatus of claim 1 including recording means responsive to said timer.

9. The apparatus of claim 1 including a second valve control on said electrolyte supply reservoir and an electrolyte overfill sensing means operatively connected to said second valve control, whereby said second valve control is closed when said sensing means detects addition of more than said constant volume of electrolyte to said titration cell.

10. An apparatus for the intermittent-continuous determination of the olefin content of hydrocarbon samples which comprises in combination a titration cell with a drain valve; a stirrer for agitating fluid in said titration cell; a first set of electrodes for coulometrically generating halogen at the constant rate in an electrolyte within said titration cell; a second set of electrodes for amperometrically detecting a preselected reference halogen concentration; an electrolyte supply reservoir with valve control whereby a constant volume of electrolyte may be periodically supplied to said titration cell; a source of hydrocarbon sample with metering means whereby a constant volume of sample may be added to the electrolyte in said titration cell; a timer in circuit with said first and said second sets of electrodes, said timer measuring the duration of halogen generation measured from after the addition of fluid sample to the moment at which said second set of electrodes amperometrically detects the preselected halogen concentration; a program-sequence controller operatively connected to said titration drain valve, to said valve control of said electrolyte supply reservoir, to said metering means of said source of hydrocarbon sample, to said stirrer and to said first and said second sets of electrodes so as to actuate in sequence; said drain valve of said titration cell so as to empty all liquids therefrom, said valve control of said electrolyte supply reservoir so as to add a constant volume of electrolyte to said titration cell, said stirrer so as to agitate said electrolyte within said titration cell, said first set of electrodes so as to coulometrically generate sufficient halogen to reach the preselected reference halogen concentration as detected by said second set of electrodes, said metering means of said source of hydrocarbon sample whereby a constant volume of hydrocarbon sample is added to said titration cell, said first set of electrodes so as to coulometrically generate sufficient halogen to reach the preselected reference halogen concentration for the second time whereby the time to reach the preselected reference halogen concentration as indicated by said timer is a measure of the olefin content of the hydrocarbon sample.

11. The apparatus of claim 10 wherein the halogen is bromine, the electrodes of said first set and said second set of electrodes are platinum, and said electrolyte is a solution comprising potassium bromide, mercuric chloride, water, acetic acid, methyl alcohol, and benzene.

12. An apparatus for the intermittent-continuous determination of the mercaptan-sulfur content of hydrocarbon samples which comprises in combination a titration cell with a drain valve; a stirrer for agitating fluid in said titration cell; a first set of electrodes for coulometrically generating at a constant rate in an electrolyte within said titration cell metallic ions reactable with mercaptan sulfur to form metallic mercaptides; a second set of electrodes for amperometrically detecting a preselected reference concentration of said metallic ions; an electrolyte supply reservoir with valve control whereby a constant volume of electrolyte may be periodically supplied to said titration cell; a source of hydrocarbon sample with metering means whereby a constant volume of sample may be added to the electrolyte in said titration cell; a timer in circuit with said first and said second sets of electrodes, said timer measuring the duration of generation of said metallic ions measured from after the addition of fluid sample to the moment at which said second set of electrodes amperometrically detects the preselected concentration of said metallic ions; a program-sequence controller operatively connected to said titration drain valve, to said valve control of said electrolyte supply reservoir, to said metering means of said source of hydrocarbon sample, to said stirrer and to said first and said second sets of electrodes so as to actuate in sequence said drain valve of said titration cell so as to empty all liquids therefrom, said valve control of said electrolyte supply reservoir so as to add a constant volume of electrolyte to said titration cell, said stirrer so as to agitate said electrolyte within said titration cell, said first set of electrodes so as to coulometrically generate sufficient metallic ions to reach the preselected reference concentration of said metallic ions as detected by said second set of electrodes, said metering means of said source of hydrocarbon sample whereby a constant volume of hydrocarbon sample is added to said titration cell, said first set of electrodes so as to coulometrically generate sufficient metallic ions to reach the preselected reference concentration of said metallic ions for the second time whereby the time to reach the preselected reference concentration of said metallic ions as indicated by said timer is a measure of the mercaptan-sulfur content of the hydrocarbon sample.

13. The apparatus of claim 12 wherein said metallic ions are silver ions, the anode of said first set of electrodes is silver, said titration cell is stainless steel, the cathode of said first set of electrodes is at least a portion of said titration cell, the anode of said second set of electrodes is a metal selected from the group consisting of platinum and silver, the cathode of said second set of electrodes is a metal selected from the group consisting of gold and silver, and said electrolyte comprises a solution of sodium nitrate, water, ethyl alcohol, acetone, and benzene.

14. An apparatus for titration of a plane stream fluid sample to a preselected reference concentration of a titrant which comprises in combination a titration cell with drain means; an agitator for agitating fluid in said titration cell; first electrode means coulometrically generating a titrant at a constant rate within said titration cell; second electrode means amperometrically detecting the preselected reference titrant concentration; an electrolyte supply reservoir means whereby a measured volume of an electrolyte may be periodically supplied to said titration cell; a source of fluid sample with metering means whereby a measured sample may be added to said titration cell; timer means in circuit with said first and said second electrode means, said timer measuring the duration of titrant generation measured from after the addition of fluid sample to the moment at which said second electrode means amperometrically detects the preselected reference titrant concentration; and a program-sequence controller operating said titration cell drain means, said electrolyte supply reservoir means, said metering means, and said first and second electrode means.

15. The apparatus of claim 14 including process control means responsive to said timer.

16. The apparatus of claim 14 including recording means responsive to said timer.

17. The process of titrating a plant stream fluid sample to a preselected reference concentration of a titrating agent which comprises in combination the steps of periodically supplying a measured volume of an electrolyte to a titration cell, coulometrically generating a titrating agent within said electrolyte in said cell to a preselected reference concentration of the generated agent, metering a measured fluid sample into the titration cell, agitating the contents of said cell, amperometrically detecting the presence of the preselected reference concentration of titrating agent and terminating the generation thereof in response to such detection, measuring the duration of titrating agent generation measured from after the metering of the fluid sample into the cell to the moment at which the preselected reference concentration is detected, maintaining a preselected level of fluids in said cell, and periodically draining fluids therefrom in a programmed and sequential manner.

18. An apparatus for titrating a plant stream fluid sample to a preselected reference concentration of a titrating agent which comprises in combination a titration cell, means for periodically supplying a measured volume of an electrolyte to said titration cell, means for coulometrically generating a titrating agent within said electrolyte in said cell to a preselected reference concentration of the generated agent, means for metering a measured fluid sample into the titration cell, means for agitating the contents of said cell, means for amperometrically detecting the presence of the preselected reference concentration of titrating agent and terminating the generation thereof in response to such detection, means for measuring the duration of titrating agent generation measured from after the metering of the fluid sample into the cell to the moment at which the preselected reference concentration is detected, means for maintaining a preselected level of fluids in said cell, and means for periodically draining fluids therefrom in a programmed and sequential manner.

References Cited in the file of this patent

UNITED STATES PATENTS

| | | |
|---|---|---|
| 2,811,202 | Schild et al. | Oct. 29, 1957 |
| 2,832,734 | Eckfeldt | Apr. 29, 1958 |

UNITED STATES PATENT OFFICE
CERTIFICATE OF CORRECTION

Patent No. 2,989,377            June 20, 1961

Frank A. Leisey

It is hereby certified that error appears in the above numbered patent requiring correction and that the said Letters Patent should read as corrected below.

Column 4, line 50, for "having" read -- have --; column 5, line 70, for "of" read -- and --; column 8, line 25, for "18" read -- 118 --; column 12, line 60, for "the" read -- a --; column 14, line 5, for "plane" read -- plant --.

Signed and sealed this 28th day of November 1961.

(SEAL)
Attest:

ERNEST W. SWIDER
Attesting Officer

DAVID L. LADD
Commissioner of Patents
USCOMM-DC